(12) United States Patent
Matsumoto et al.

(10) Patent No.: US 8,661,064 B2
(45) Date of Patent: Feb. 25, 2014

(54) FILE MANAGEMENT SYSTEM

(75) Inventors: Toshiko Matsumoto, Tokyo (JP); Ryo Nakashige, Tokyo (JP); Yasuyuki Nozaki, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 181 days.

(21) Appl. No.: 13/000,393

(22) PCT Filed: Jun. 25, 2009

(86) PCT No.: PCT/JP2009/061566
§ 371 (c)(1),
(2), (4) Date: Dec. 21, 2010

(87) PCT Pub. No.: WO2010/001794
PCT Pub. Date: Jan. 7, 2010

(65) Prior Publication Data
US 2011/0106846 A1    May 5, 2011

(30) Foreign Application Priority Data

Jun. 30, 2008 (JP) ................................. 2008-170479

(51) Int. Cl.
*G06F 7/00* (2006.01)
*G06F 17/30* (2006.01)

(52) U.S. Cl.
USPC ........................................................ 707/803

(58) Field of Classification Search
None
See application file for complete search history.

(56) References Cited

U.S. PATENT DOCUMENTS

| | | | |
|---|---|---|---|
| 6,477,528 B1 | 11/2002 | Takayama | |
| 2004/0139103 A1* | 7/2004 | Boyce et al. | 707/102 |
| 2005/0246313 A1 | 11/2005 | Turski et al. | |
| 2005/0278331 A1 | 12/2005 | Hatori | |
| 2006/0036568 A1 | 2/2006 | Moore et al. | |
| 2007/0011210 A1* | 1/2007 | Flamma et al. | 707/200 |
| 2007/0059740 A1 | 3/2007 | Linden | |

FOREIGN PATENT DOCUMENTS

| | | |
|---|---|---|
| CN | 1707479 | 12/2005 |
| CN | 101124572 A | 2/2008 |
| JP | 2001-043231 | 2/2001 |
| JP | 2004-110445 | 4/2004 |
| JP | 2005-352701 | 12/2005 |

(Continued)

OTHER PUBLICATIONS

English translation of Written Opinion of the International Searching Authority in the related International Application No. PCT/JP2009/061566(4 pages).

(Continued)

*Primary Examiner* — Uyen Le
(74) *Attorney, Agent, or Firm* — Robert P. Michael; Lucas & Mercanti, LLP

(57) ABSTRACT

Provided is a file (document) management process for efficiently understanding a summary of files in a folder without checking the contents of the individual subfolders or files. A summary of a plurality of files included in a folder is generated dynamically (each time the folder is accessed by placing a cursor on the folder, for example) and is displayed. For example, a summary of a feature of files included in a folder, which is recognized as being different from the feature of a plurality of files included in a sibling folder through comparison, determined on the basis of a feature or tendency of a file attribute, is described, and a location distribution of query-hit documents in the tiered folder is displayed.

6 Claims, 16 Drawing Sheets

(56) References Cited

FOREIGN PATENT DOCUMENTS

| JP | 2006-285513 | 10/2006 |
|---|---|---|
| JP | 2007-080205 | 3/2007 |
| JP | 2008-071293 | 3/2008 |
| WO | 2006/060773 A2 | 6/2006 |

OTHER PUBLICATIONS

Visual Cabinet (NEC Corporation): http://www.nec.co.jp/univerge/solution/pack/visual_cabinet/index.html.

The Extended European Search Report dated Dec. 6, 2012 issued by the European Patent Office in connection with the corresponding European patent application No. 09773372.9 (3 pages).

C. Eric Wu et al., "An Advanced Accounting Service for AIX Systems," Proceedings of the 2005 IEEE International conference on Services Computing (SCC' 05), Jul. 11-15, 2005, IEEE Computer Society, vol. 2, pp. 159-167, XP010952953.

Min Zhou et al., "Analysis of Personal Computer Workloads," Proceedings of the 7th International Symposium on Modeling, Analysis and Simulation of Computer and Telecommunication Systems, Oct. 24-28, 1999, IEEE Computer Society, pp. 208-217, XP010356914.

"Windows Directory statistics," http://web.archive.org/web/20080514183944/http://windirstat.info/, May 14, 2008 [Retrieved Nov. 25, 2011], pp. 1-3, XP55013224.

English translation of International Search Report Dated May 12, 2009 issued by the International Searching Authority in a related International Application No. PCT/US2009/061566 (2 pages).

Written Opinion of the International Searching Authority dated Aug. 4, 2009 in the related International Application No. PCT/US2009/061566(4 pages).

Scanner: http://www.steffengerlach.de/freeware/ (6 pages), printed Dec. 20, 2010.

WinDu2:http://www.vector.co.jp/soft/win95/util/se059546.html (3 pages), printed Dec. 17, 2010.

WinDirStat: http://windirstat.sourceforge.net (1 page), printed Dec. 17, 2010.

SequoiaView: http://w3.win.tue.nl/nl/onderzoek/onderzoek_informatica/visualization/sequoiaview (2 pages), printed Dec. 17, 2010.

SpaceMonger: http://www.sixty-five.cc/sm/ (1 page), printed Dec. 17, 2010.

Google Search Appliance: http://www.google.co.jp/enterprise/gsa/ (2 pages), printed Dec. 17, 2010.

Velocity: http://vivisimo.com/html/products (1 page), printed Dec. 20, 2010.

Rack-Rack Library (PFU Limited): http://www.pfu.fujitsu.com/raku2library/ (3 page), printed Dec. 20, 2010.

Search Report dated Dec. 11, 2012 issued in related Japanese Application No. 2008-170479 (in Japanese) (3 pages).

Hisashi Shimamura, et al., "A Domain Clustering for WWW Document Search," C&C Media Research Laboratories, NEC Corporation, Mar. 13, 1998 (9 pages with English Abstract on p. 3).

T. Ikegami, "Hanzatsu na Kanrigyomu yo Sayonara (Good-bye to management work), Windows 2000 Server Resource Kit Katsuyo Koza (Windows 2000 Server Resource Kit Implementation Course)," IDG Japan, Inc., Oct. 1, 2001, vol. 6, No. 10, pp. 254-257 (15 pages).

Communication (Office Action) issued Aug. 28, 2013 by the Chinese Patent Office in related Chinese Patent Application No. 200980125522.1 (4 pages).

Office Action dated Mar. 26, 2013 issued in related Japanese Application No. 2008-170479 (in Japanese) (2 pages).

Xinorbis, http://gigazine.net/new/2080018_xinorbis, Jan. 18, 2008 (in Japanese) (5 pages); with English language translation (3 pages).

* cited by examiner

FIG. 2
A
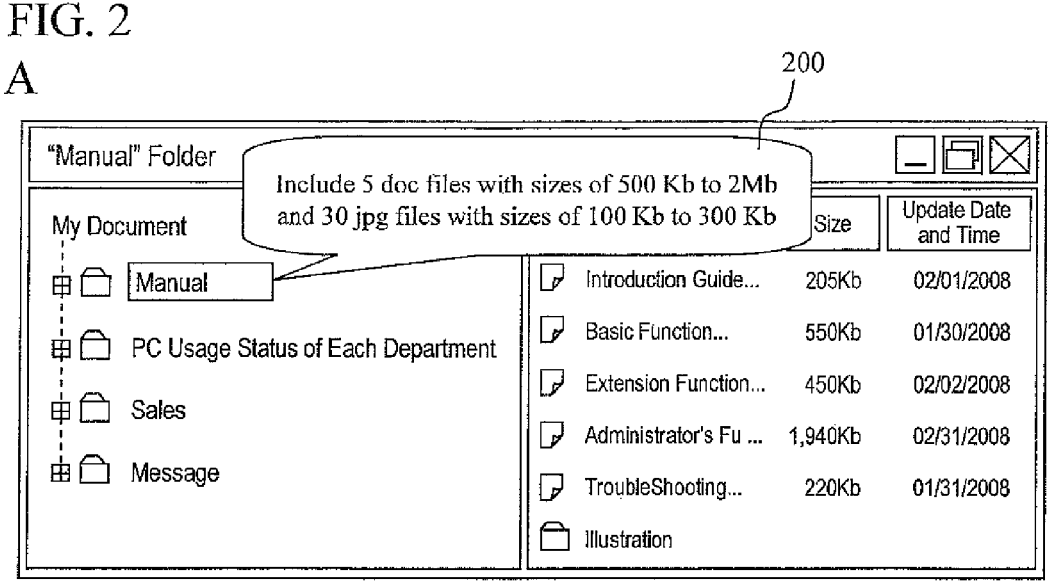
B
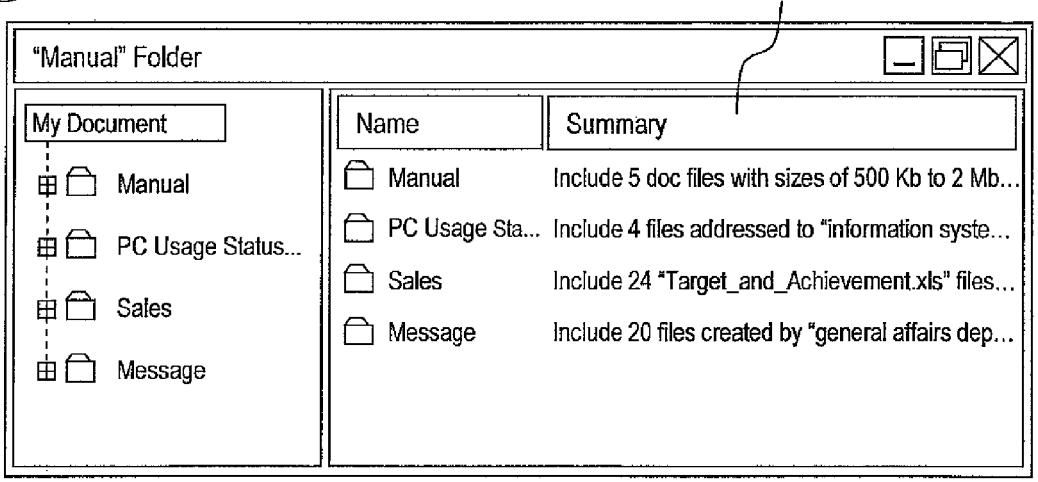
C
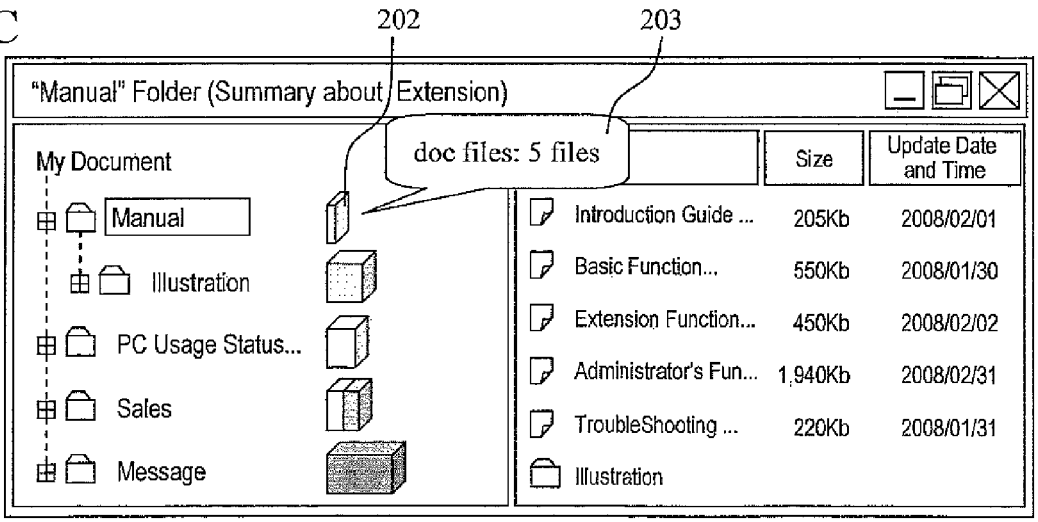

FIG. 6
A
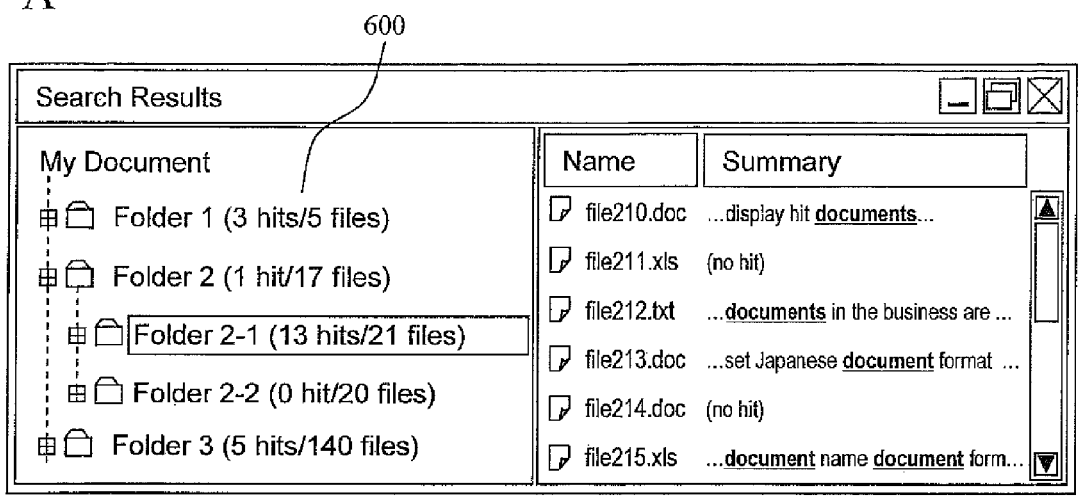
B
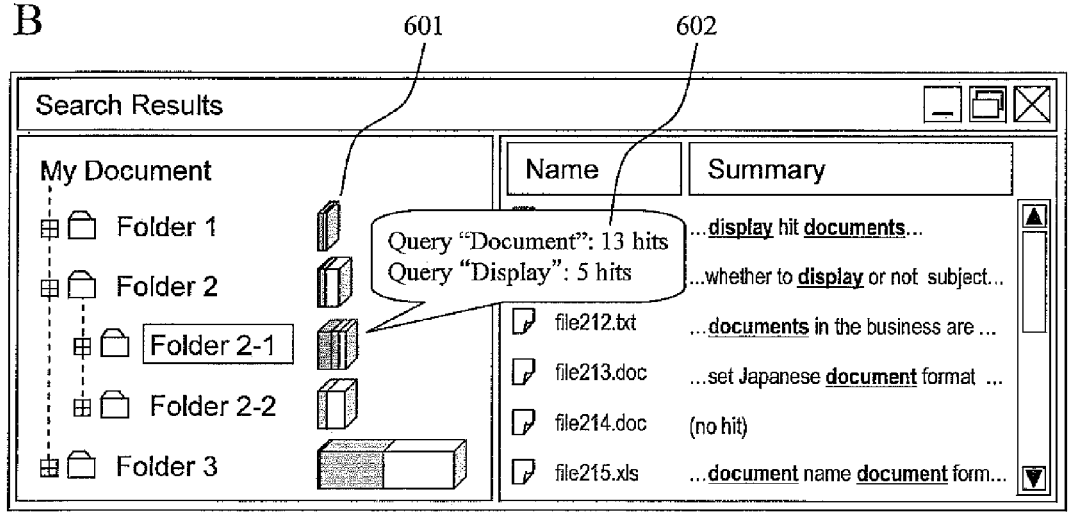

FIG. 7
A
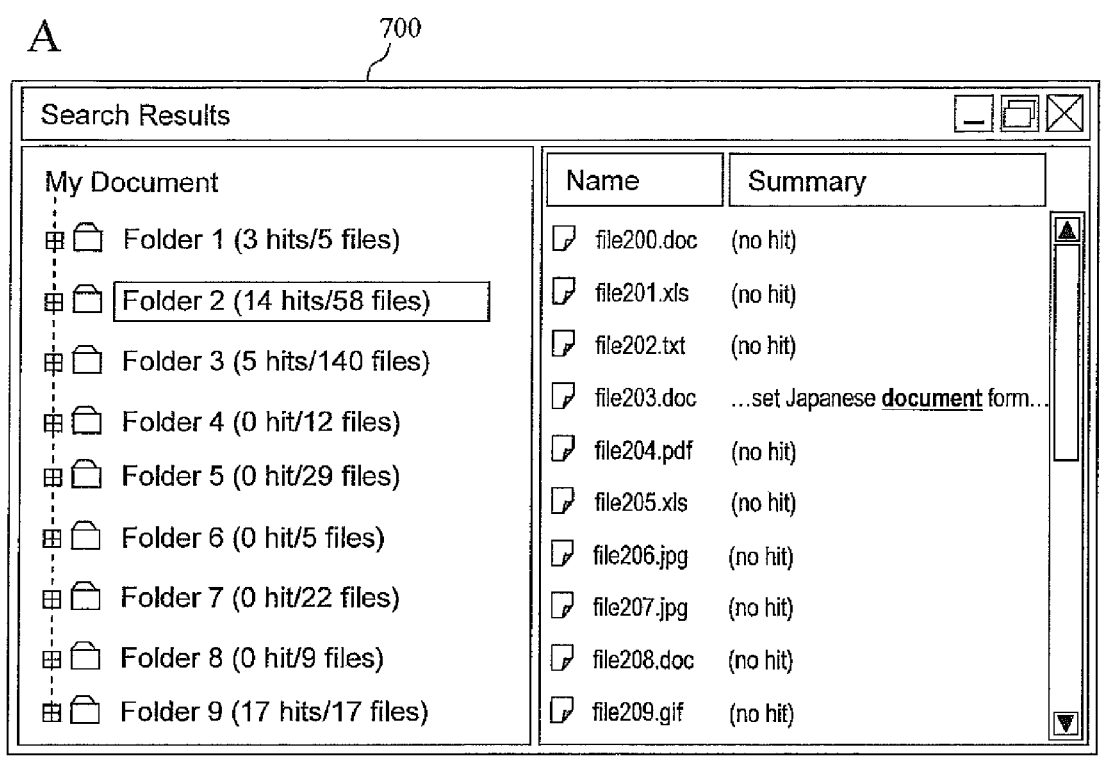
B
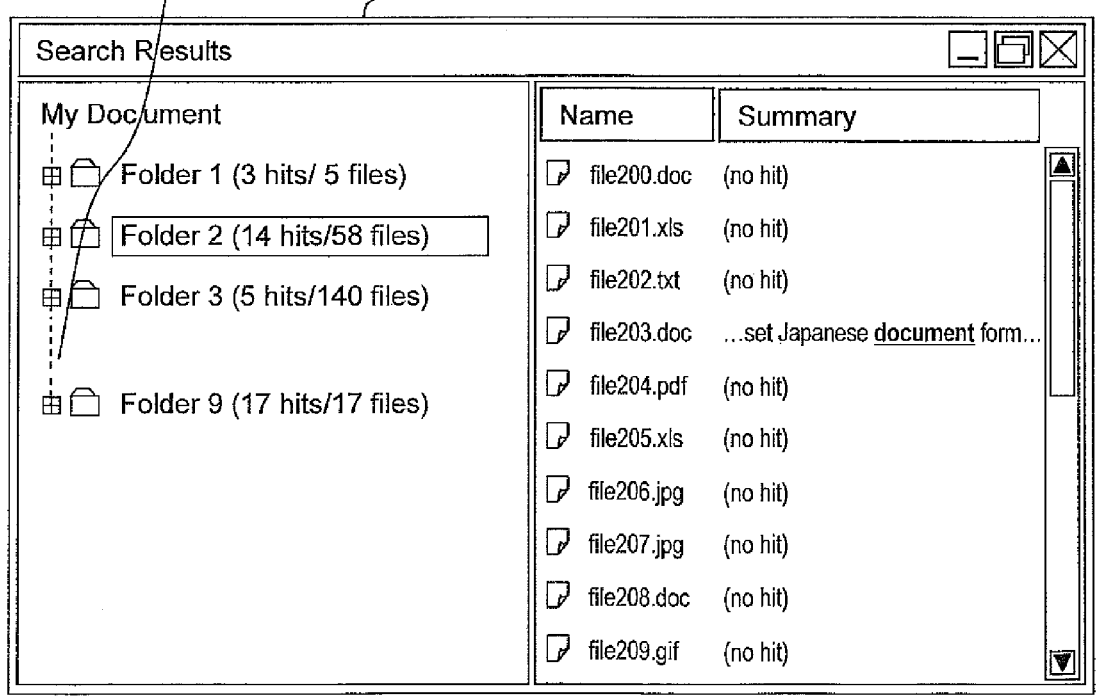

FIG. 9

Folder Content Data (Data Example of File)

| | Member Name | Value |
|---|---|---|
| 900 | Path Name | "C:¥My_Document¥img001.jpg" |
| 901 | Subfolder? | FALSE |
| 902 | Displayed in Expanded Form? | NULL |
| 903 | Histogram | NULL |
| 904 | File Size | 160Kb |
| 905 | File Extension | jpg |
| 906 | File Type | Image |
| 907 | File Creation Date | February 8, 2008 |
| 908 | File Last Update Date | February 9, 2008 |
| 909 | File Last Browsed Date | February 10, 2008 |
| 910 | File Submission Date | February 11, 2008 |
| 911 | Creator of File | Mary Smith |
| 912 | Group of Creator of File | Research Department |
| 913 | Source of File | Designing Department, A Corporation |
| 914 | Destination of File | Sales Department, B Corporation |
| 915 | Folder Depth | NULL |
| 916 | Number of Folders | NULL |

FIG. 10

| | Member Name | Value |
|---|---|---|
| | Folder Content Data (Data Example of Subfolder) | |
| 1000 | Path Name | "C:¥My_Document¥Folder1" |
| 1001 | Subfolder? | TRUE |
| 1002 | Displayed in Expanded Form? | YES |
| 1003 | Histogram | {{"doc", 5}, {"jpg", 30}, ...} |
| 1004 | File Size | NULL |
| 1005 | File Extension | NULL |
| 1006 | File Type | NULL |
| 1007 | File Creation Date | NULL |
| 1008 | File Last Update Date | NULL |
| 1009 | File Last Browsed Date | NULL |
| 1010 | File Submission Date | NULL |
| 1011 | Creator of File | NULL |
| 1012 | Group of Creator of File | NULL |
| 1013 | Source of File | NULL |
| 1014 | Destination of File | NULL |
| 1015 | Folder Depth | 3 |
| 1016 | Number of Folders | 14 |

| | Extension-Type Defining Data | |
|---|---|---|
| | Member Name | Value |
| 1100 | Extension | "jpg" |
| 1101 | Type | "image" |

B

| | Document Hit Data | |
|---|---|---|
| | Member Name | Value |
| 1102 | Path Name | "C:¥leader01¥temp¥file001.txt" |
| 1103 | Hit Query | {"document", "display"} |
| 1104 | Summary | "...display hit documents..." |

FILE MANAGEMENT SYSTEM

This is a U.S. National Phase Application under 35 U.S.C. 371 of International Application PCT/JP2009/061566, filed on Jun. 25, 2009, which claimed the priority of Japanese Application No. 2008-170479, filed Jun. 30, 2008, the entire content of both applications are hereby incorporated by reference.

TECHNICAL FIELD

The present invention relates to a file management system, and for example, relates to displaying a summary of a business file (document) using its document structure.

BACKGROUND ART

In recent years, documents used in organizations have been increasingly created and stored as electronic data. Such trend has been accelerated by the storage cost reduction, increased awareness of the internal control, and expansion of the advantages of electronic data (e.g., can be stored at low cost and can be shared easily) with the progress of computer technology.

As the technologies for displaying files in a tiered folder with a tree structure managed by a file system, the following has been developed and provided so far.

1) Existing Technology 1: dir command of Windows (registered trademark) or ls command of Unix (registered trademark): files in a specific folder are listed.

2) Existing Technology 2: tree command and explorer of Windows(registered trademark): A folder tier structure is displayed in a tree structure. With the explorer, it is possible to display subfolders of a specified holder, and not display substructures of the other folders.

3) Existing Technology 3: Disk-space display software: Software that displays the tiers of a folder and the sum of the file size in the folder has been developed. Examples of such software include Scanner, WinDu2, WinDirStat, Sequoia-View, and SpaceMonger (Non-Patent Documents 1 to 5). Such software has the object of visually determining what kind of files occupy the great part of the disk space and finding and deleting unnecessary, large-size files to efficiently obtain a disk free space.

4) Existing Technology 4: Document search: documents that contain a character string specified as a query by a user are listed. "Google Search Appliance" (Non-Patent Document 6) provided by Google Inc. has a function of highlight-displaying a query character string contained in documents. "Velocity" (Non-Patent Document 7) provided by Vivisimo has a function of, when a plurality of documents that contains a query is found, dynamically classifying the documents by the fields of the documents, and displaying the results.

5) Existing Technology 5: As a document management system, a document management system that uses a user interface imitating a bookshelf and binders has been provided (Non-Patent Document 8). This system has a function of sorting stored documents into binders by the kinds of the documents and permitting comment writing by use of labels.

Non-Patent Document 1: Scanner: http://www.stef-fengerlach.de/freeware/

Non-Patent Document 2: WinDu2:http://www.vectorco.jp/soft/win95/util/se059546.html Non-Patent Document 3: WinDirStat: http://windirstat.sourceforge.net/

Non-Patent Document 4: SequoiaView: http://w3.win.tue.nl/nl/onderzoek/onderzoek_informatica/visualization/sequoiaview Non-Patent Document 5: SpaceMonger: http://www.sixty-five.cc/sm/

Non-Patent Document 6: Google Search Appliance: http://www.google.co.jp/enterprise/gsa/

Non-Patent Document 7: Velocity: http://vivisimo.com/html/products

Non-Patent Document 8: Visual Cabinet (NEC Corporation): http://www.nec.co.jp/univerge/solution/pack/visual_cabinet/index.html Non-Patent Document 9: Rack-Rack Library (PFU LIMITED): http://www.pafujitsu.com/raku2library/

DISCLOSURE OF THE INVENTION

Problems to be Solved by the Invention

With regard to documents created in an organization, a plurality of documents related to a single business is often created and managed by a plurality of persons in charge. In many organizations, file management is conducted by, for example, placing a shared folder on a file server, establishing a given rule on the file storage location therein, and permitting a plurality of persons in charge to store files in the folder.

Under such circumstances, there has been increased demand for a method for efficiently understanding a summary of files in a folder for the following reasons.

First of all, concerning a long-term business such as a single business conducted over several years, documents created in the course of the business should also be managed for the same period of time. Therefore, it would be difficult to keep remembering which file was stored at which level of a tiered folder.

Second, when file management is shared by a plurality of persons in charge, it would be difficult for other persons in charge to know what kind of file was stored where. Even when a rule is established on the storage location, it is often the case that, if a file of a type that is not defined by the rule is newly created, the storage location of the file is newly prepared at the discretion of the person in charge who created the file.

Third, persons that are involved in a single business are not necessarily fixed, and (an)other person(s) in charge may often get involved in the business later. In such a case, the person(s) who got involved in the business later suddenly has access to documents that have accumulated so far, and thus may not be able to even determine which subfolder to be browsed first. Fourth, when electronic data is used, it is possible to store a large amount of documents easily in comparison with a case in which documents are stored in paper. Thus, both the number and amount of the documents tend to increase, which in turn increases the aforementioned first to third tendencies.

By the way, with regard to paper documents, it is possible to know a summary of documents bound in a folder (e.g., what kind of and how many documents there are) by skimming through the pages, checking the headlines bound between the pages, or checking the thickness of the pages between the headlines. Meanwhile, when a plurality of folders is stored in a book storeroom, it is possible to know a summary of documents (e.g., what kind of and how many documents there are) by viewing the number of the folders or the spines of the folders.

However, it is impossible with none of the existing technologies 1 to 5 (including Non-Patent Documents 1 to 9) cited above to know a summary about what kind of and how many documents there are. That is, when the command cited as the existing technology 1 is used, the command should be executed to each folder, which is not efficient when the number of folders has increased or when the number of folder tiers has increased. Meanwhile, with the document search cited as the existing technology 2, documents that have been searched for as containing a query character string are displayed in a list regardless of the locations of the documents in a tiered folder. Thus, it is only possible to obtain information about each individual document that has been searched for but is impossible to obtain information about the entire folder. Further, the software cited as the existing technology 3 only focuses on the sum of the file sizes in a folder, and is able to obtain little information about small-size files, which is thus insufficient to know a summary of files in a folder. Further, the existing technology 3 is a technology that is assumed to be used mainly at home by individuals. Thus, the display listing properties would degrade if the number of folder tiers has increased or the number of folders has increased. The existing technology 5 focuses on imitating a paper-based document management method. Therefore, it is conversely difficult to handle files stored in a shared folder on a file server. When a shared folder is provided on a file server, such a folder typically has a depth of tiers corresponding to the content thereof. In contrast, when file management is conducted with a bookshelf and binders, it would only be possible to create three tiers at the most even when indexes are sandwiched between the binders. Non-Patent Document 9 describes, with regard to the Rack-Rack Library, that 1000 or more binders and files with 1000000 or more pages can be handled. Although a case is considered in which a large amount of files and folders should be handled on a file server, it is easily conceivable that an increase in the number of binders would make it difficult to check the spines of the binders.

The present invention has been made in view of the foregoing circumstances, and provides business document management that can help efficiently understand a summary of files in a folder without opening the individual subfolders or files, under a circumstance in which a plurality of persons in charge manages the number and size of documents such as those in a shared file server for a long period of time. The present invention also provides business document management that can help understand, in a query search, a summary of a location distribution of a plurality of files, which contains a query character string, on a tiered folder.

Means for Solving the Problems

In order to solve the aforementioned problems, according to the present invention, a summary of a plurality of files included in a folder is created dynamically (each time the folder is accessed by placing a cursor on the folder, for example) and is displayed. Accordingly, it is possible to efficiently understand a summary of files in a folder without checking the contents of the individual subfolders or files.

A summary of a plurality of files included in a folder is described on the basis of one or more of the following features or tendencies (a character string that frequently appears in file names, a character string that frequently appears in subfolder names, a character string that frequently appears in titles, sequential-number character strings that appear in file names, sequential-number character strings that appear in subfolder names, sequential-number character strings that appear in titles, a concentration of files in a subfolder, similarity of subfolders, and a distribution of files across nodes of a plurality of dimensions) of an attribute (file size, file extension, file type, file creation date, file last update date, file last browsed date, file submission date, file creator, file creator's group, source of the file, destination of the file, folder depth, or the number of subfolders).

For example, in the case of FIG. 1, a summary to the effect that a "Manual" folder includes "5 doc files with sizes of 500 Kb to 2 Mb and 30 jpg files with sizes of 100 Kb to 300 Kb" is displayed. Accordingly, a user can roughly understand what kind of files the "Manual" folder includes without actually checking the content of the folder (without opening the folder). Although the example of the summary herein is based on the features of the file size and extension, the same can be applied to other attributes.

Then, a summary that has been obtained dynamically (each time the folder is accessed (the folder is selected)) is displayed as indicated by 200 to 203 in FIGS. 2A to 2C, whereby check materials of the folder content can be appropriately provided to a user. It would be effective to display summaries on the basis of various attributes as indicated by 201 in FIG. 2B or equally display summaries on the basis of an attribute specified by a user (attribute herein is "extension") as indicated by 202 in FIG. 2C. Reference numbers 200 and 203 indicate that a "Manual" folder shown by hatching are currently being selected, and a summary of the folder is displayed. Reference number 201 indicates that a "My Document" folder shown by hatching is currently being selected, and a summary of each subfolder included in the folder is displayed. Reference numbers 202 and 203 indicate that a summary of files immediately under the "Manual" folder is displayed as the "Manual" folder is displayed in the expanded form (which is the information about a summary not including those of the files in the "Illustration" subfolder).

With regard to a file type, if image files that have different extensions (e.g., jpg files and tiff files), for example, are defined as files of the same type in advance, and such extensions are combined into one, it becomes possible to display a summary in accordance with the level of detail requested by a user.

Further, according to the present invention, a summary of a file that contains a sequential-number character string is efficiently displayed. Herein, a sequential-number character string contained in a file name refers to a circumstance in which a plurality of files contains a sequential-number character string. Suppose, for example, that a report is created by repeatedly modifying it, and a file whose file name has embedded therein a version number such that "Report_Ver1.doc" is stored. In such a case, sufficient information about the required summary can be displayed by displaying the presence of a ".doc" file whose file name contains a character string "Report_Ver" and a number. Other than the circumstance in which version numbers appear in sequence as illustrated herein, other circumstances can also be considered in which ID numbers of staff members, resources, and the like are assigned. The same can be applied to sequential-number character strings that appear in subfolder names.

According to the present invention, a summary is efficiently displayed even when files are concentrated in a given subfolder. Files being concentrated in a given subfolder refer to a circumstance in which a subfolder named "Collected in Oct., 2007" in a folder shown FIG. 3 includes 90 percent of the files, for example. In such a case, it is possible to display a summary of more important files by focusing on the subfolder and describing a summary on the basis of a feature or tendency of an attribute such that "most of the files are in the subfolder 'Collected in Oct., 2007' and the files included therein are doc files with sizes of 100 Kb to 500 Kb." For example, a template character string indicating that "most of the files are in a 'A (subfolder name)' subfolder and the files included therein are files of 'C (file type)' with 'B (Size)'" is stored in memory so that a summary is generated by extracting information corresponding to the constituent elements A to C from the folder content data (FIGS. 9 and 10) which is described later.

According to the present invention, similarity of subfolders is also considered. Herein, subfolders being similar refer to a circumstance in which files included in a plurality of subfolders are similar. For example, when different versions of manuals for a single product are stored in different subfolders, files included in the subfolders are considered to be similar. Thus, it would be sufficient to display a summary of only one of the subfolders and display information to the effect that the other subfolder is a similar subfolder. Accordingly, a summary of a folder can be shown with fewer representations, which can help efficient understanding.

According to the present invention, a case in which files are distributed across nodes of a plurality of dimensions is also considered. Herein, files being distributed across nodes of a plurality of dimensions refer to a circumstance such as shown in FIG. 4. The example shown herein is a case in which files related to a plurality of departments, periods, and types are created. For a folder tier structure, it is necessary to create a tree structure on the basis of the folder classification by selecting any one of a department, period, and type. Thus, subfolders of lower levels are arranged in a similar form (in the example herein, both the departments have the same combination of subfolders arranged in each period). In such a circumstance, it would be more efficient to consider the space of a plurality of dimensions (department, period, and type) and display the presence of a file on each node rather than to display a summary of the folder content in accordance with the tree structure. Accordingly, it becomes possible to display a summary of files included in a folder in a form that can be more easily understood by a user such that "each department in each month has a single xls file and a single doc file."

According to the present invention, a summary of a plurality of files included in a folder is described on the basis of a feature that is recognized as being different from the feature of a plurality of files included in a sibling folder through comparison. For example, referring to a tiered folder such as shown in FIG. 5, a case is considered in which a summary of the content of a folder "Product A Ver. 2 Presentation Document" is to be displayed. In the example herein, a folder "Product A Ver. 1 Presentation Document" and the folder "Product A Ver. 2 Presentation Document" are in the sibling relationship. In this case, both the folder "Product A Ver. 1 Presentation Document" and the folder "Product A Ver. 2 Presentation Document" include many ppt files. Therefore, there is little sense in describing information to the effect that "the folder includes many ppt files" as a summary of the folder "Product A Ver. 2 Presentation Document." Rather, describing a summary of the folder "Product A Ver. 2 Presentation Document" on the basis of a difference recognized between the files included in the folder "Product A Ver. 2 Presentation Document" and the files included in the folder "Product A Ver. 1 Presentation Document" in terms of their file creation date or last update date, for example, will make it possible to provide information that can be more easily understood by a user (as the ver. 2 was developed later, for example). It should be noted that if a parent folder of a plurality of subfolders is identical, such subfolders are sibling subfolders. However, sibling folders are not necessarily similar folders.

According to the present invention, when a result of a query search for documents that are stored in a tiered folder is displayed, a distribution of the locations of the query-hit documents in the tiered folder is displayed (see FIG. 6). The existing search engines are configured to arrange documents, which contain a query character string, in a row in accordance with the independently calculated scores, while discarding information about at which level of the tiered folder each file is located. The existing technology such as Velocity (Non-Patent Document 7), which dynamically clusters documents using the contents of the documents, does not use information about the locations of the documents in the tiered folder, either. The present invention provides a query search result display such as those indicated by 600 or 601 and 602 in FIGS. 6A and 6B. Accordingly, it is possible to provide a user with information about "how many files in which subfolder contain a query character string" on the basis of a rule on the file storage location established by an individual or among a plurality of persons in charge. With such information, it is possible to provide a user with a summary of a location distribution of a plurality of files, which contains a query character string, on the tiered folder.

According to the present invention, a tiered folder is displayed in the expanded form while partially omitting the tiered folder. For example, a tiered folder and a distribution of the locations of files that contain a query character string such as indicated by 700 in FIG. 7A are considered. There is little sense in displaying the entire tiered folder, inclusive of folders that include no files containing a query, as indicated by 700. Thus, as indicated by 701 in FIG. 7B, a summary of only folders that include files containing a query character string are displayed, while folders 4 to 8 are omitted as indicated by 702. With this method, it is possible to provide information that can be more easily understood by a user.

That is, a file management system in accordance with the present invention is a file management system that manages files stored in a tiered folder, and includes a folder content data storage unit adapted to have stored therein content data of each folder in the tiered folder, a folder summary calculation processing unit configured to reference the folder content data storage unit and generate a character string indicating a summary of a plurality of files included in a folder that is selected by a user, and a display processing unit configured to display the generated character string on a display device.

Herein, when a file attribute is specified, the folder summary calculation processing unit acquires a histogram of the specified attribute for the plurality of files instead of generating the character string. Then, the display processing unit displays the acquired histogram on the display device.

When the selected folder has a distribution of files across nodes of a plurality of dimensions (tiers), the folder summary calculation processing unit generates a summary character string indicating the presence of a file on each node while also describing the name of each node in the summary.

Further, when a plurality of subfolders in the selected folder includes similar files, the folder summary calculation processing unit generates a summary character string indicating the presence of a plurality of subfolders that includes similar files while also describing the names of the subfolders in the summary.

When the selected folder does not contain any subfolders that include similar files and when there is a concentration of files in a subfolder, the folder summary calculation processing unit generates a summary character string indicating the presence of a subfolder with a concentration of files and the name of the subfolder with the concentration of the files.

A file management system in accordance with the present invention is a file management system that manages files stored in a tiered folder, and includes a file storage unit adapted to have stored therein a plurality of files, a search index storage unit adapted to have stored therein a search index, a query search processing unit configured to execute a query search with reference to the search index stored in the search index storage unit, and obtain search results, a location distribution processing unit configured to acquire, for each folder in which the plurality of files is stored, information about the number of files that match the search results, and a display processing unit configured to display on a display device the number of the matching files for each folder. Herein, the display processing unit displays the number of the matching files in text. Alternatively, the location distribution processing unit creates a histogram on the basis of the information about the number of the files that match the search results, and the display processing unit displays the histogram for each file. It should be noted that the display processing unit can be configured to omit display of folders that include no files that match the search results.

A file management system in accordance with the present invention is a file management system that manages files stored in a tiered folder, and includes a file storage unit adapted to have stored therein a plurality of files, a search index storage unit adapted to have stored therein a search index, a folder content data storage unit adapted to have stored therein content data of each folder in the tiered folder, a folder summary calculation processing unit configured to, when a summary display is specified as a display mode, reference the folder content data storage unit, and generate a character string indicating a summary of a plurality of files included in a folder that is selected by a user, a query search processing unit configured to, when a location distribution display of query search results is specified as a display mode, execute a query search with reference to the search index stored in the search index storage unit, and obtain search results, a location distribution processing unit configured to acquire, for each folder in which the plurality of files is stored, information about the number of files that match the search results, and a display processing unit configured to display, in response to the specified display mode, the generated character string on a display device or display the number of the matching files for each folder on the display device.

Further features of the present invention will become apparent from the following best mode for carrying out the present invention and the accompanying drawings.

Advantages of the Invention

According to the present invention, it is possible for a user to efficiently understand a summary of files in a folder without checking the contents of the individual subfolders or files. Further, it is also possible to understand, in a query search, a summary of a location distribution of a plurality of files, which contains a query character string, on a tiered folder.

BRIEF DESCRIPTION OF THE DRAWINGS

FIG. 2 is a diagram showing an example of a screen that displays a summary of files included in a folder.

FIG. 6 is a diagram showing an example of a screen that displays a summary of a location distribution of a plurality of files, which contains a query character string, on a tiered folder.

FIG. 7 is a diagram showing an example of a screen that displays a summary of only folders that include files containing a query character string.

FIG. 9 is a diagram showing an exemplary data structure of the folder content data.

FIG. 10 is a diagram showing another exemplary data structure of the folder data content.

FIG. 11 is a diagram showing exemplary data structures of extension-type defining data and document hit data.

BEST MODES FOR CARRYING OUT THE INVENTION

Hereinafter, an embodiment of the present invention will be described with reference to the accompanying drawings. It should be noted that the present embodiment is merely illustrative for the purpose of implementing the present invention and is not intended to limit the technical scope of the present invention. Structures that are common throughout the drawings are assigned identical reference numbers.

<Configuration of the Business Document Processing System>

Figure 8:
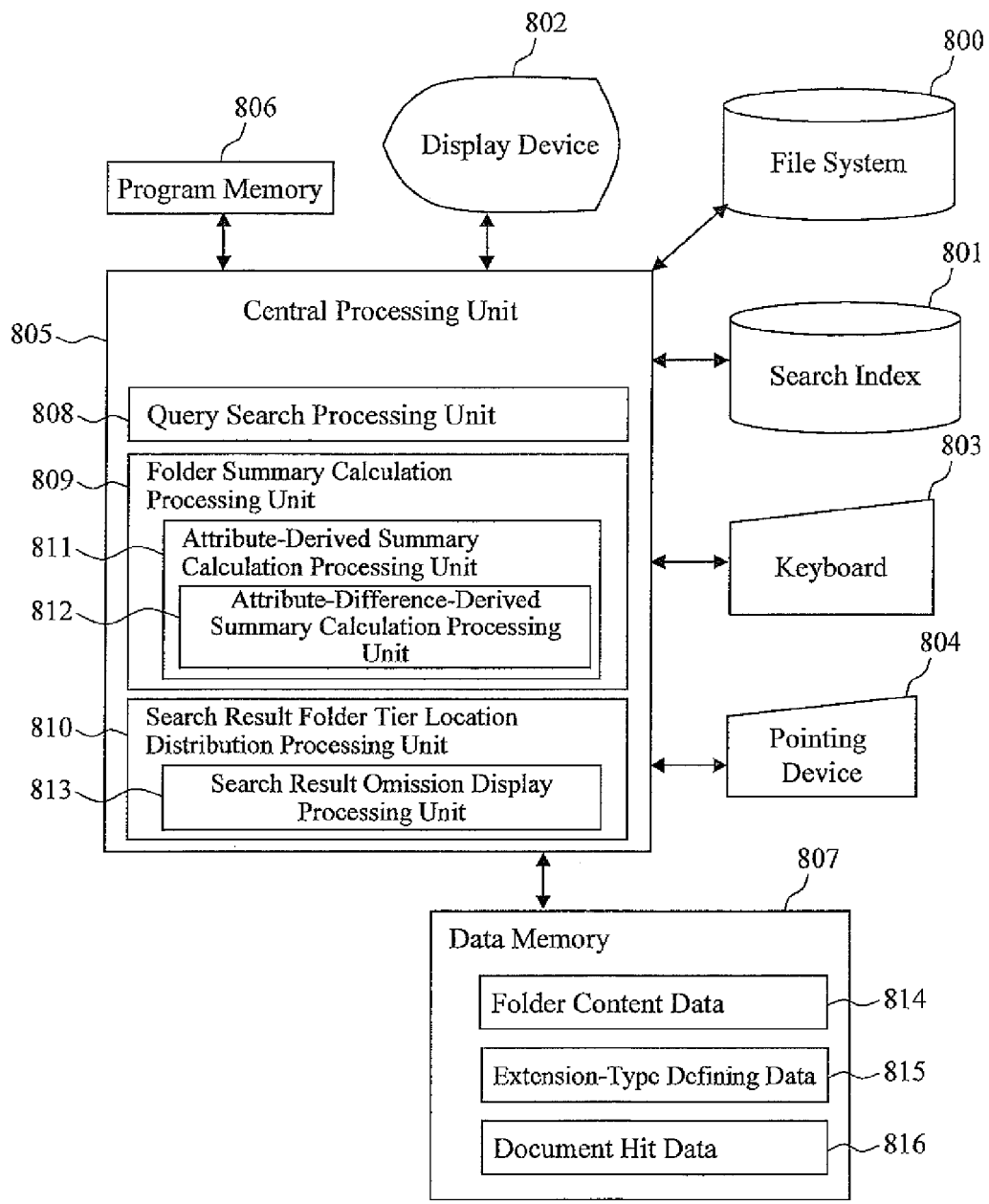
FIG. 8 is a functional block diagram showing the schematic configuration of a business document processing system in accordance with an embodiment of the present invention.

FIG. 8 is a functional block diagram schematically showing the internal configuration of a business document processing system implemented as one embodiment of the present invention. This business document processing system includes a file system (DB) 800 that holds a folder tier structure and files, a search index 801 used for a search engine to perform a full-text search for files, a display device 802 that displays data, a keyboard 803 and a pointing device 804 such as a mouse for performing an operation of, for example, selecting a menu for the displayed data, a central processing unit 805 that performs a necessary arithmetic process, control process, and the like, program memory 806 having stored therein programs that are necessary for processes to be performed in the central processing unit 805, and data memory 807 having stored therein data that is necessary for processes to be performed in the central processing unit 805.

The central processing unit 805 includes a query search processing unit 808 that performs a full-text search for the files stored in the file system, a folder summary calculation processing unit 809 that calculates a summary of a folder, and a search result folder tier location distribution processing unit 810 that calculates a distribution of query-hit documents in a tiered folder. The folder summary calculation processing unit 809 includes an attribute-derived summary calculation processing unit 811 that calculates a summary of a folder on the basis of an attribute. The attribute-derived summary calculation processing unit 811 includes an attribute-difference-derived summary calculation processing unit 812 that calculates a summary of a folder whose attribute is recognized as being different from that of a sibling folder. The search result folder tier location distribution processing unit 810 includes a search result omission display processing unit 813 that displays a tiered folder in the expanded form while omitting part of the tiered folder.

The data memory 807 includes folder content data 814 that holds information about the folder content (subfolder or file), extension-type defining data 815 that holds information about an extension and the type thereof, and document hit data 816 that holds information about which files contain a search query.

<Data Content of the Data Memory 807>

FIGS. 9, 10, and 11 are diagrams showing the data structures of the folder content data 814, the extension-type defining data 815, and the document hit data 816 included in the data memory 807.

FIGS. 9 and 10 each show the data structure of the folder content data, and illustrate data examples of a file and a subfolder, respectively. The folder content data shown in FIG. 9 includes a path name 900, a flag 901 indicating if the folder content is a subfolder, a flag 902 indicating, when the folder content is a subfolder, if the subfolder is expanded, a histogram 903 of, when the folder content is a subfolder, the attributes of files under the subfolder, size 904 indicating, when the folder content is a file, the size of the file, extension 905 indicating, when folder content is a file, the extension of the file, type 906 defined by, when the folder content is a file, the extension-type defining data 815 of the extension, creation date 907 indicating, when the folder content is a file, the creation date of the file, last update date 908 indicating, when the folder content is a file, the last update date of the file, last browsed date 909 indicating, when the folder content is a file, the last browsed date of the file, submission date 910 indicating, when the folder content is a file, the submission date of the file, creator 911 indicating, when the folder content is a file, the creator of the file, creator's group 912 indicating, when the folder content is a file, the group of the creator of the file, source 913 indicating, when the folder content is a file, the source of the file, destination 914 indicating, when the folder content is a file, the destination of the file, folder depth 915 indicating, when the folder content is a subfolder, the depth of folders under the subfolder, and the number of folders 916 indicating, when the folder content is a subfolder, the number of folders under the subfolder. Each of such data is acquired from the property information of each file and is arranged in a list. As FIG. 9 illustrates a case in which the folder content is a file, the field 901 indicates FALSE, and fields 902, 903, 915, and 916 indicate NULL. Conversely, as FIG. 10 illustrates a case in which the folder content is a subfolder, field 1001 indicates TRUE and fields 1004 to 1014 indicate NULL.

FIG. 11A shows the data structure of the extension-type defining data 815. The extension-type defining data is an array of elements including an extension 1100 and type 1101. For example, when both jpg files and tiff files are defined as image files, the array includes two elements that are an element whose extension 1100 is "jpg" and whose type 1101 is "image" and an element whose extension 1100 is "tiff" and whose type 1101 is "image."

FIG. 11B shows the data structure of the document hit data 816. The document hit data is an array of elements including a path name 1102, a hit query 1103, and a summary 1104. When a single document contains a plurality of query character strings, the hit query 1103 holds the plurality of query character strings. For example, in the example shown in FIG. 11, a document whose path name is "C:¥leader01¥temp¥file001.txt" contains two query character strings: "document" and "display." Thus, the hit query 1103 holds the two query character strings.

<Operation of the Business Document Processing System>

Hereinafter, processes performed by the business document processing system in accordance with the embodiment of the present invention will be described.

1) Overview of Operation

Figure 12:
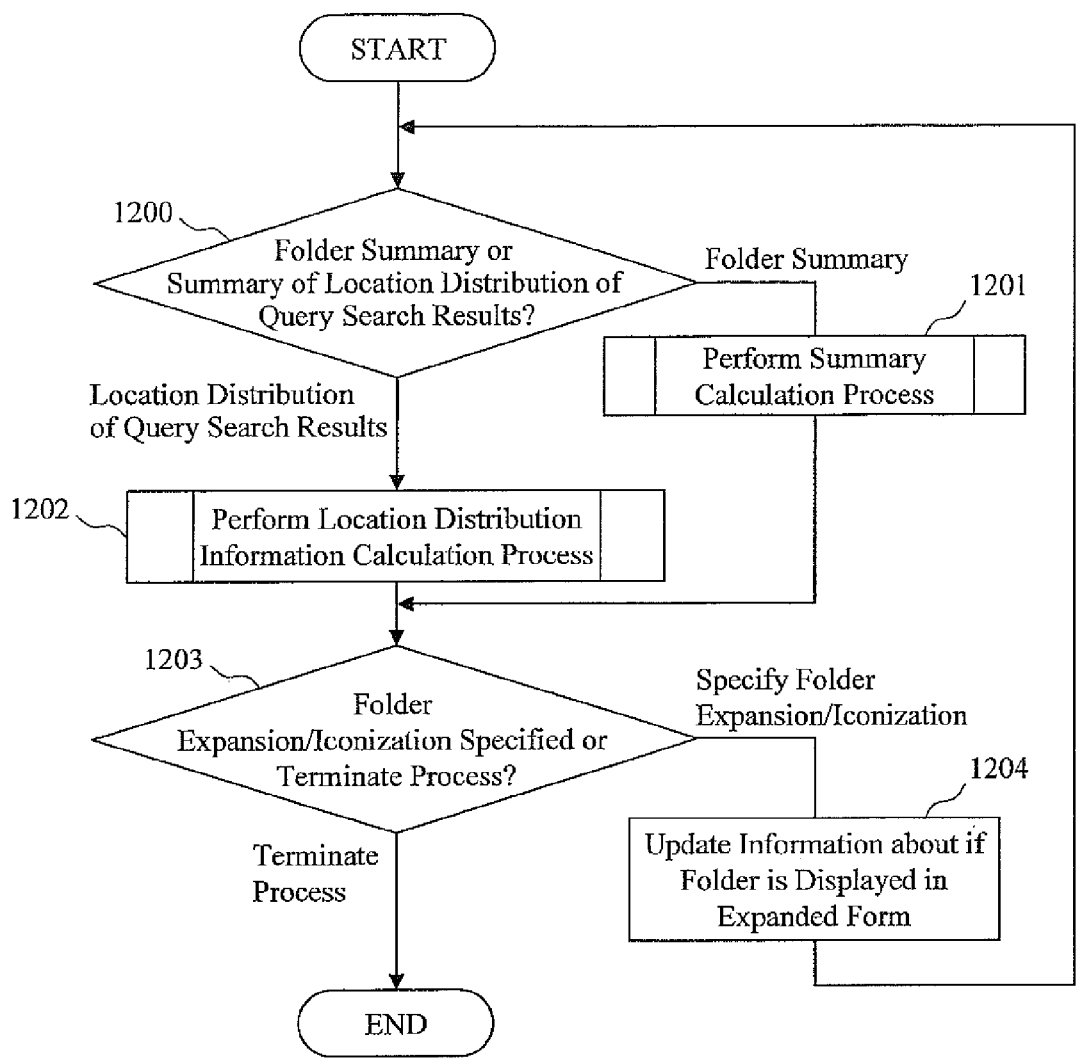
FIG. 12 is a flowchart for illustrating the overall process of displaying a summary of files and a summary of a location distribution of a plurality of files, which contains a query character string, performed by a business document processing system.

FIG. 12 is a flowchart schematically showing a flow of the processes performed by the business document processing system. In FIG. 12, the central processing unit 805, upon receipt of an instruction from a user, determines if a process corresponding to the instruction is displaying a summary of a folder or displaying a summary of a location distribution of query search results on a tiered folder (step 1200). If the process to be performed is determined to be displaying a summary of a folder, the folder summary calculation processing unit 809 performs a process of calculating a summary of the folder (step 1201). If the process to be performed is determined to be displaying a summary of a location distribution of query search results on a tiered folder in step 1200, the query search processing unit 808 executes a search and acquires query search results. Then, the search result folder tier location distribution processing unit 810 performs a process of calculating location distribution information of the query search results in the tiered folder (step 1202).

After that, the central processing unit 805 receives an instruction from a user, and determines if it is an instruction to expand the folder or to icon-display the folder or an instruction to terminate the process (step 1203). Herein, to "expand a folder" means expanding a folder if subfolders are displayed in a row, and to "iconize a folder" means rearranging an expanded folder into a single row. If the process to be performed is specified as the expansion or the icon-display of the folder, the flag 902, which indicates if the folder content data 814 is displayed in the expanded form, is updated in accordance with the entry by the user (step 1204). Then, processes are repeated from step 1200 once again. If the process to be performed is determined to be the termination of the process in step 1203, the flow ends.

2) Details of Step 1201

Figure 13:
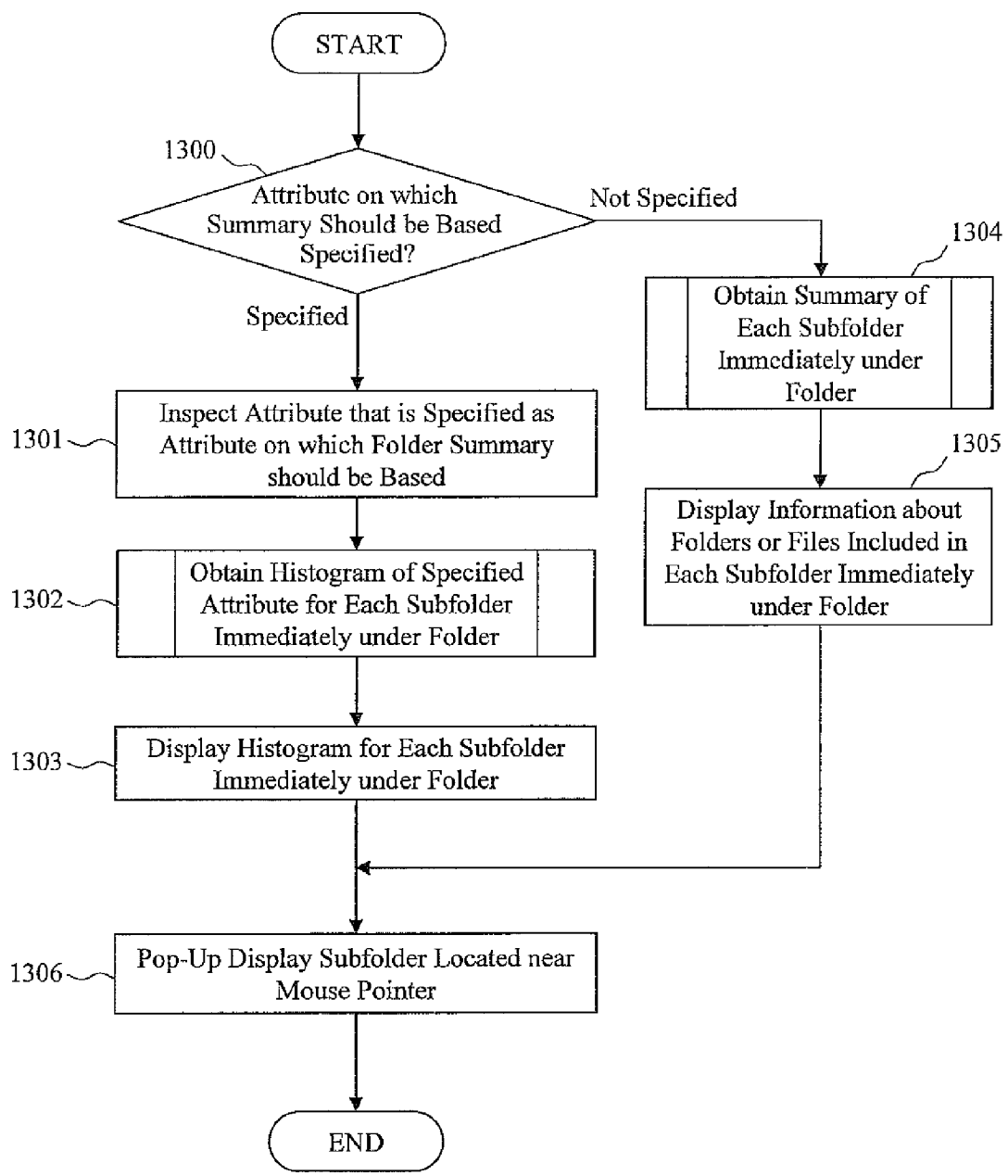
FIG. 13 is a flowchart for illustrating the details of a process of calculating a summary of a folder.

FIG. 13 is a flowchart for illustrating the details of a process of calculating a summary of a folder in step 1201 in FIG. 12.

First, the folder summary calculation processing unit 809 receives an instruction from a user, and determines if an attribute on which a summary of the folder should be based is specified (step 1300). If an attribute is determined to be specified, the folder summary calculation processing unit 809 checks which attribute is specified as the attribute on which a summary of the folder should be based (step 1301). In addition, the folder summary calculation processing unit 809 obtains a histogram of the attribute determined to be specified in step 1301 for each subfolder immediately under the folder (step 1302). Then, the folder summary calculation processing unit 809 displays the histogram determined in step 1302 for each subfolder immediately under the folder as indicated by 202 in FIG. 2 (step 1303).

If an attribute is not determined to be specified by a user in step 1300, the folder summary calculation processing unit 809 obtains a summary of each subfolder immediately under the folder (step 1304). Then, the folder summary calculation processing unit 809 displays information about folders or files included in each subfolder immediately under the folder as indicated by 201 in FIG. 2 (step 1305). A subfolder near a mouse pointer is displayed in pop-up as indicated by 200 and 203 in FIGS. 2A and 2C (step 1306).

3) Details of Step 1302

Figure 14:
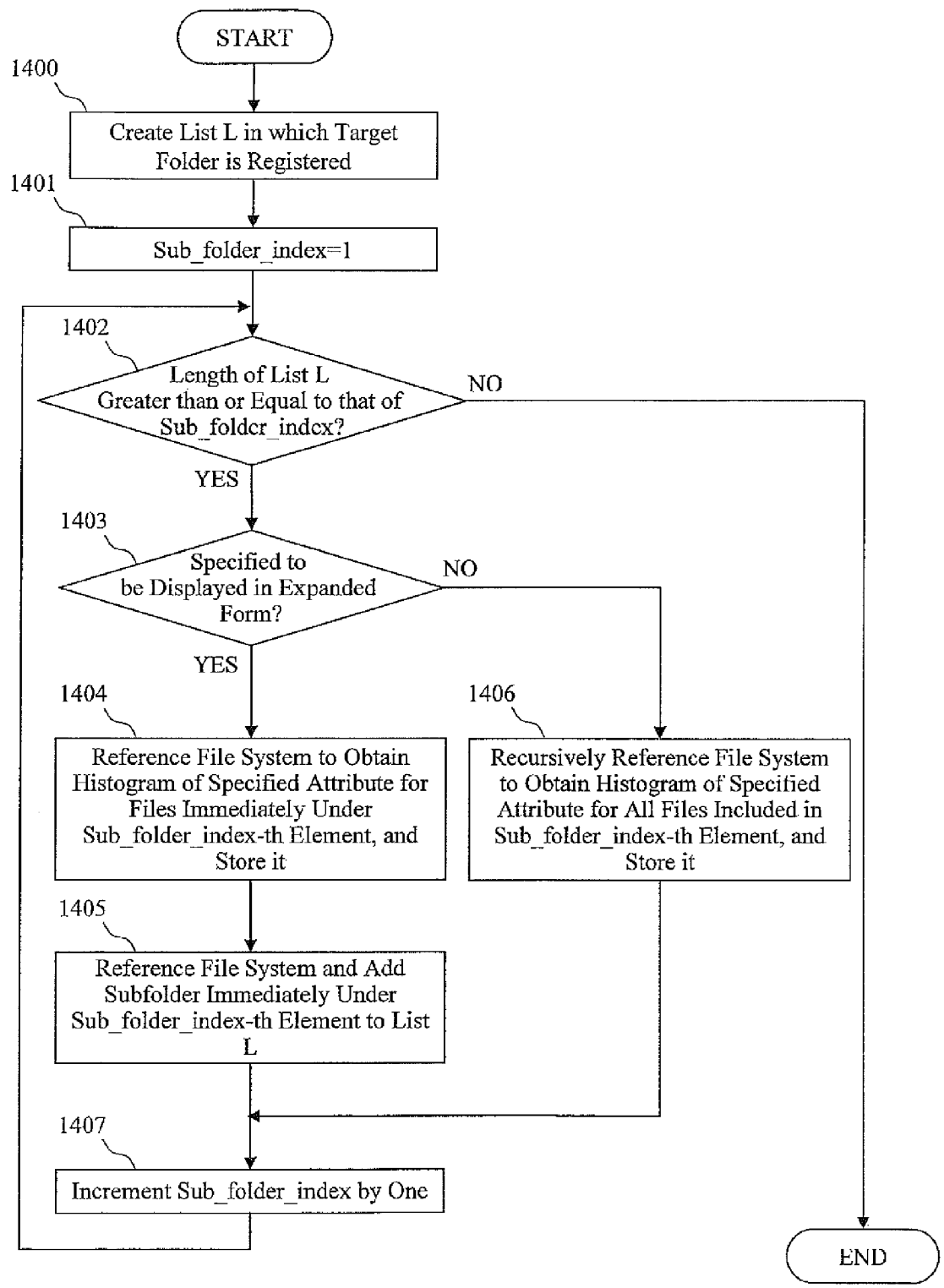
FIG. 14 is a flowchart for illustrating the details of a process of obtaining a histogram of a specified attribute for each subfolder immediately under a folder.

FIG. 14 is a flowchart for illustrating the details of a process of obtaining a histogram of the specified attribute for each subfolder immediately under the folder in step 1302 in FIG. 13.

First, the folder summary calculation processing unit 809 references the folder content data 814 shown in FIGS. 9 and 10, and creates a list L of the target folder (step 1400). Next, the folder summary calculation processing unit 809 initializes a Sub_folder_index as a variable index of the list with one (step 1401). Then, the folder summary calculation processing unit 809 inspects if the length of the list L is greater than or equal to that of the Sub_folder_index (step 1402). If the length of L is determined to be less than that of the Sub_folder_index, the process terminates.

Meanwhile, if the length of L is determined to be greater than or equal to that of the Sub_folder_index, the folder summary calculation processing unit 809 continues the process. First, the folder summary calculation processing unit 809 references a flag 1002, which indicates if the Sub_folder_index-th element in the list L is displayed in the expanded form, to inspect if the element is specified to be displayed in the expanded form (step 1403). If the element is specified to be displayed in the expanded form, the folder summary calculation processing unit 809 references the file system 800 to inspect the specified attribute of the files immediately under the Sub_folder_index-th element and form a histogram, and stores it as the histogram 1003 (step 1404). Then, the folder summary calculation processing unit 809 references the file system 800, and adds to the list L the subfolder immediately under the Sub_folder_index-th element in the list L (step 1405).

If the Sub_folder_index-th element is not specified to be displayed in the expanded form in step 1403, the folder summary calculation processing unit 809 recursively references the file system 800 to inspect the specified attribute of all flies included in the Sub_folder_index-th element in the list L and form a histogram, and then stores it as the histogram 1003 (step 1406). Thereafter, the folder summary calculation processing unit 809 increments the Sub_folder_index by one (step 1407), and repeats the processes from step 1402 once again.

4) Details of Step 1304

Figure 15:
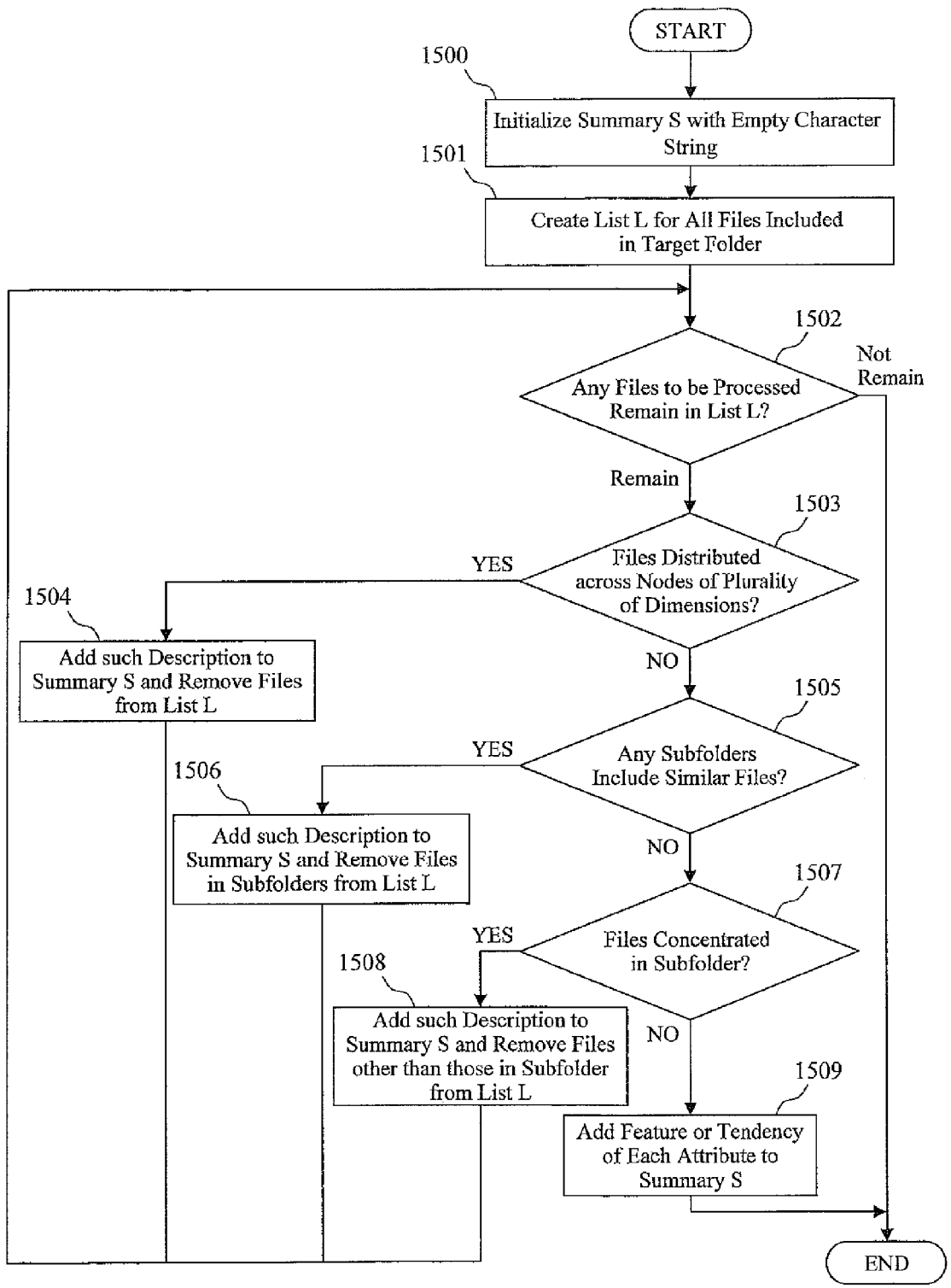
FIG. 15 is a flowchart for illustrating the details of a process of obtaining a summary of each subfolder immediately under a folder.

FIG. 15 is a flowchart for illustrating the details of a process of obtaining a summary character string of each subfolder (a character string representing the content of each subfolder) immediately under the folder in step 1304 in FIG. 13.

First, the folder summary calculation processing unit 809 initializes a character string. S for storing a summary using an empty character string (step 1500). Next, the folder summary calculation processing unit 809 recursively references the file system 800, and creates a list L in which all files included in the target folder are stored as the folder content data shown in FIG. 9 (step 1501). Next, the folder summary calculation processing unit 809 inspects if the list L contains the element (a file to be processed) (step 1502).

Figure 1:
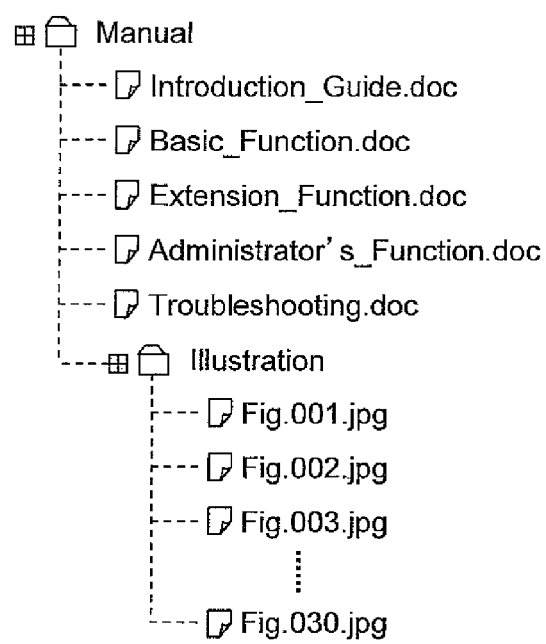
FIG. 1 is a diagram showing an example of files included in a folder.
Figure 3:
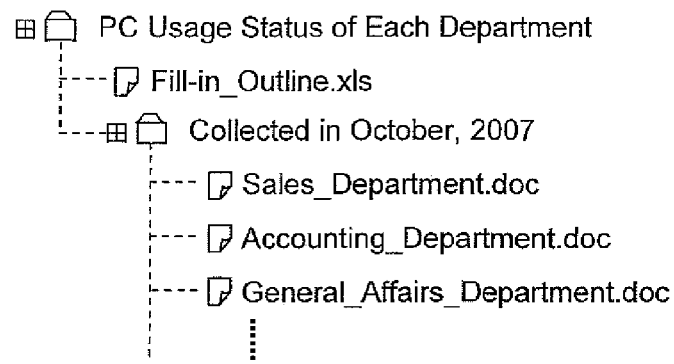
FIG. 3 is a diagram showing an example of a circumstance in which a specific subfolder includes a number of files.
Figure 4:
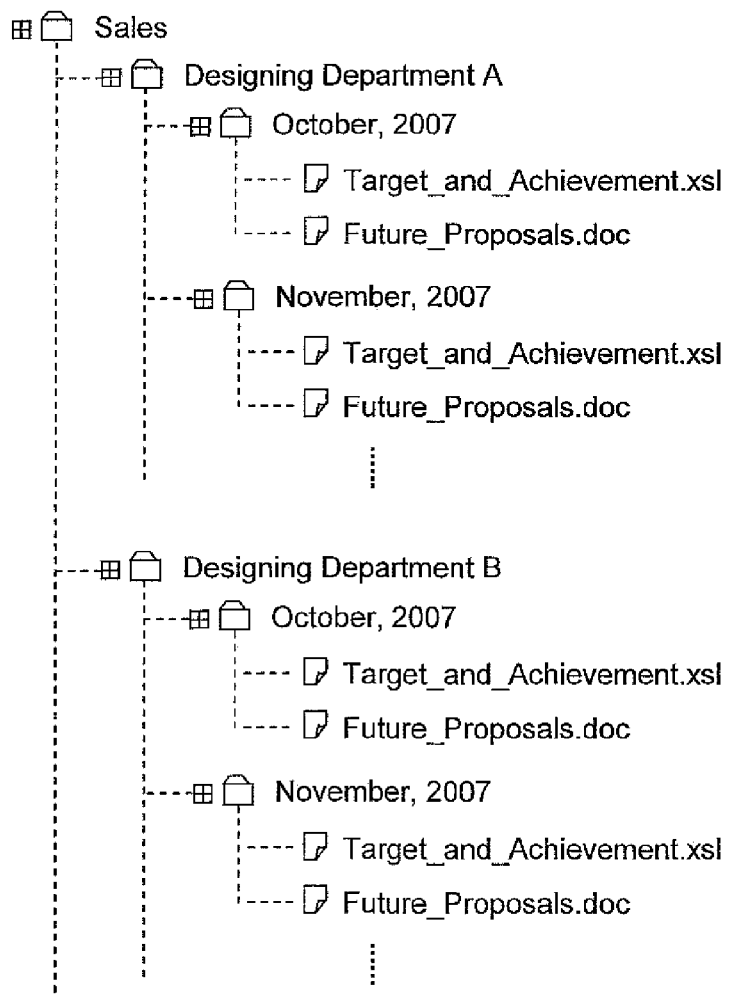
FIG. 4 is a diagram showing an example of a circumstance in which files concerning a plurality of departments, periods, and types are created.
Figure 5:
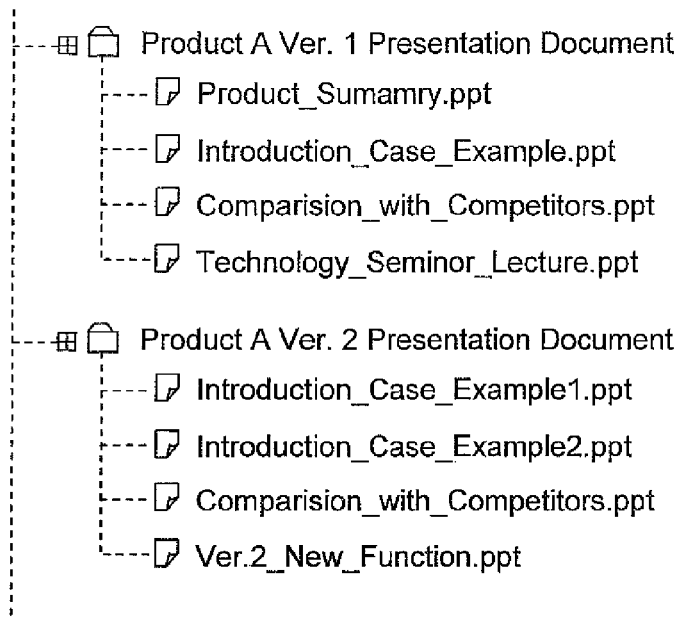
FIG. 5 is a diagram showing an example of a plurality of files included in a sibling folder.

If the list L does not contain the element, the process terminates. Conversely, if the list L contains the element, the folder summary calculation processing unit 809 first inspects for the presence of a distribution of files across nodes of a plurality of dimensions such as that described with reference to FIG. 4 (step 1503). If such file distribution is determined to be present, the folder summary calculation processing unit 809 adds to the summary S a representation indicating the presence of a file in each dimension while also describing the name of each dimension in the summary, and then removes such files from the list L (step 1504). For example, in a structure such as shown in FIG. 4, summary character strings representing the designing department A and the designing department B are created, and then the folders of the designing department A and the designing department B are removed from the list L. A summary character string is created by, for example, storing a character string template in memory and inserting suitable characters into the empty fields in the template. In the case of FIG. 4, if a template: "[ ] file related to [ ]" is provided, a character string is created by inserting "xls, doc" and "sales" into the respective fields.

Thereafter, the folder summary calculation processing unit 809 repeats the processes from step 1502 once again. If a distribution of files across nodes of a plurality of dimensions is determined to be absent in step 1503, the folder summary calculation processing unit 809 inspects for the presence of a plurality of subfolders that includes similar files (step 1505). If such subfolders are determined to be present, the folder summary calculation processing unit 809 adds to the summary S a representation to the effect that some subfolders include similar files while also describing the names of the subfolders in the summary, and removing the files included in the subfolders from the list L (step 1506).

The folder summary calculation processing unit 809 repeats the processes from step 1502 once again. If a plurality of subfolders that includes similar files are determined to be absent in step 1505, the folder summary calculation processing unit 809 inspects for the presence of a concentration of files in a subfolder (step 1507). If a concentration of files is determined to be present, the folder summary calculation processing unit 809 adds to the summary S the name of the subfolder as well as a description to the effect that the subfolder includes a large number of files, and then removes files other than those included in the subfolder from the list L (step 1508).

The folder summary calculation processing unit 809 further repeats the processes from step 1502 once again. When a concentration of files is determined to be absent in step 1507, the attribute-difference-derived summary calculation processing unit 812 adds to the summary S a feature that is recognized as being different from the feature of a plurality of files included in a sibling folder, in terms of the following feature or tendency (a character string that frequently appears in file names, a character string that frequently appears in subfolder names, a character string that frequently appears in titles, sequential-number character strings that appear in file names, sequential-number character strings that appear in subfolder names, or sequential-number character strings that appear in titles) of each file attribute (file size, file extension, file type, file creation date, file last update date, file last browsed date, file submission date, file creator, file creator's group, source of the file, destination of the file, folder depth, or the number of folders) (step 1509), and then terminates the process. Determination of the difference in step 1509 can be performed using the existing technology of the statistical testing.

5) Details of Step 1202

Figure 16:
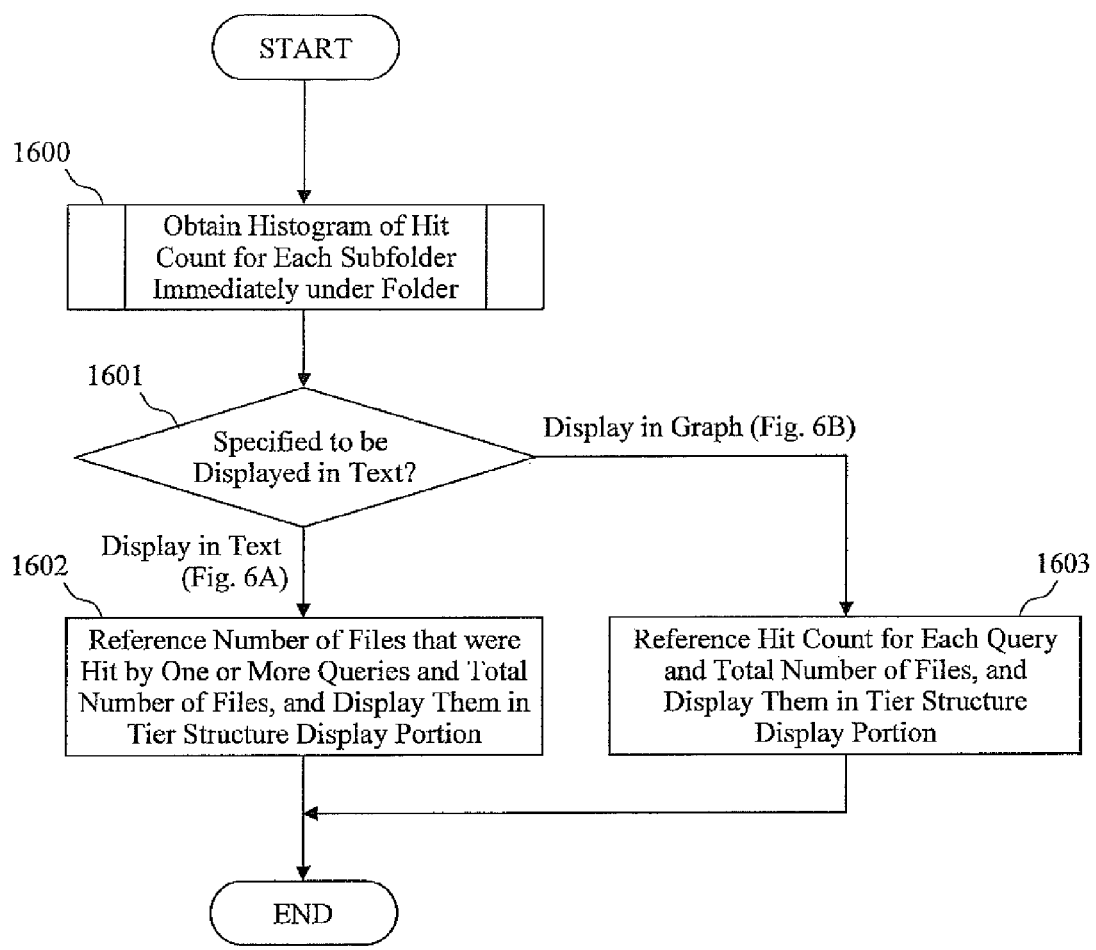
FIG. 16 is a flowchart for illustrating the details of a process of calculating the location distribution information of query search results in a tiered folder.

FIG. 16 is a flowchart for illustrating the details of a process of calculating the location distribution information of query search results in the tiered folder in step 1202 in FIG. 12. First, the search result folder tier location distribution processing unit 810 obtains a histogram of the hit count of files, which were hit by the query search performed by the query search processing unit 808, for each subfolder immediately under the folder (step 1600). Then, the folder summary calculation processing unit 809 receives an instruction from a user, and determines if the hit count is specified to be displayed in text (step 1601).

If the hit count is specified to be displayed in text, the folder summary calculation processing unit 809 references the histogram for the number of files that were hit by one or more queries and the total number of files, and displays only folders that include files containing the query character string as indicated by 701 in FIG. 7, in the tier structure display portion as indicated by 600 in FIG. 6 (step 1602).

Meanwhile, if the hit count is specified to be displayed not in text but in graph, the folder summary calculation processing unit 809 references the histogram for a hit count for each query and the total number of files, and displays them in the tier structure display portion as indicated by 601 in FIG. 6B (step 1603).

6) Details of Step 1600

Figure 17:
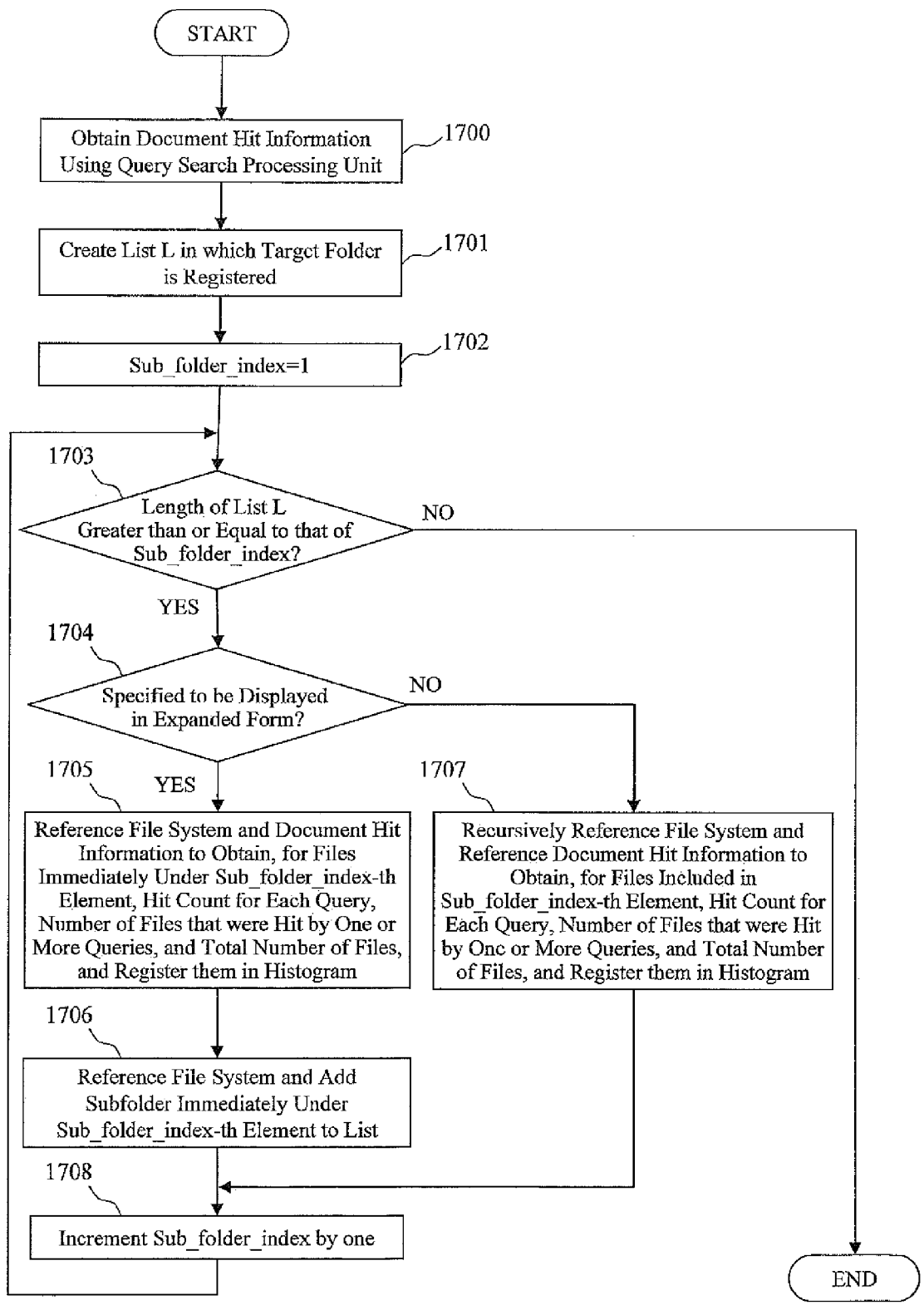
FIG. 17 is a flowchart for illustrating the details of a process of obtaining a histogram of a hit count for each subfolder immediately under a folder.

FIG. 17 is a flowchart for illustrating the details of a process of obtaining a histogram of a hit count for each subfolder immediately under the folder in step 1600 in FIG. 16. First, the query search processing unit 808 references the search index 801 to acquire document hit information, and stores it in the form of the document hit data shown in FIG. 11B (step 1700). This can be achieved with the existing technology in the field of search engines.

Next, the search result folder tier location distribution processing unit 810 creates a list L of the target folder by referencing the folder content data 814 shown in FIGS. 9 and 10 (step 1701), and initializes the Sub_folder_index as a variable index of the list L with one (step 1702).

The search result folder tier location distribution processing unit 810 determines if the length of the list L is greater than or equal to that of the Sub_folder_index (step 1703). If the length of L is less than that of the Sub_folder_index, the process terminates. Conversely, if the length of L is greater than or equal to that of the Sub_folder_index, the search result folder tier location distribution processing unit 810 references the flag 1002, which indicates if the Sub_folder_index-th element in the list L is displayed in the expanded form, to check if the element is specified to be displayed in the expanded form (step 1704). If the element is specified to be displayed in the expanded form, the search result folder tier location distribution processing unit 810 references the file system 800 and the document hit information obtained in step 1700 to obtain, for files immediately under the Sub_folder_index-th element in the list L, a hit count for each query, the number of files that were hit by one or more queries and the total number of files, and registers them in the histogram 1003 (step 1705). Then, the search result folder tier location distribution processing unit 810 references the file system 800 and adds to the list L the subfolder immediately under the Sub_folder_index-th element in the list L (step 1706).

Meanwhile, if the element is not specified to be displayed in the expanded form in step 1704, the search result folder tier location distribution processing unit 810 recursively references the file system 800 and also references the document hit information obtained in step 1700 to obtain, for all files included in the Sub_folder_index-th element in the list L, a hit count for each query, the number of files that were hit by one or more queries and the total number of files, and registers them in the histogram 1003 (step 1707). Then, the search result folder tier location distribution processing unit 810 increments the Sub_folder_index by one (step 1708), and repeats the processes from step 1703 once again.

<Supplements>

In this embodiment, version numbers or ID numbers of staff members or resources are given as examples of the sequential-number character strings that appear in file names. Besides, a case in which a file name contains a file creation date or a case in which there is a missing number is considered. Therefore, it is also possible to use 0 to 9 or consecutive English alphabetical characters for file names as a tendency of an attribute. The same can be applied to subfolder names. In addition, it is also possible to use the number of folders excluding empty folders for the folder depth 915 or the number of folders 916 as the attributes retained in the folder content data shown in FIG. 9.

Described above is a case in which, when only folders that include files containing a query character string are displayed as indicated by 701 in FIG. 7B, a hit count is specified to be displayed in text in FIG. 16. Besides, even when a hit count for each query is specified to be displayed in graph, it is also possible to display only folders that include files containing a query character string. Further, it is also possible to expand the omitted portion indicated by 702 in response to a request from a user and switch the display such that all of the folders 4 to 8 are displayed.

The file system 800 in FIG. 8 can also be a document DB such as a document management system. Alternatively, the file system 800 can be substituted by search indexes that are obtained by crawling a file system with a search engine.

It should be noted that the present invention can also be realized by a program code of software that implements the function of the embodiment. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the function of the aforementioned embodiment, and the program code itself and the storage medium having recorded thereon the program code constitute the present invention. As the storage medium for supplying such a program code, for example, a flexible disk, CD-ROM, DVD-ROM, a hard disk, an optical disc, a magneto-optical disc, CD-R, a magnetic tape, a nonvolatile memory card, ROM, or the like is used.

Further, based on an instruction of the program code, an OS (operating system) running on the computer or the like may perform some or all of actual processes, and the function of the aforementioned embodiment may be implemented by those processes. Furthermore, after the program code read from the storage medium is written to the memory in the computer, the CPU or the like of the computer may, based on the instruction of the program code, perform some or all of the actual processes, and the function of the aforementioned embodiment may be implemented by those processes.

Moreover, the program code of the software that implements the function of the embodiment may be distributed via a network, and thereby stored in storage means such as the hard disk or the memory in the system or the apparatus, or the storage medium such as CD-RW or CD-R, and at the point of use, the computer (or the CPU or the MPU) in the system or the apparatus may read the program code stored in the storage means or the storage medium and execute the program code.

Description of Symbols

800 File System
801 Search Index
802 Display Device
803 Keyboard
804 Pointing Device
805 Central Processing Unit 806 Program Memory
807 Data Memory
808 Query Search Processing Unit
809 Folder Summary Calculation Processing Unit
810 Search Result Folder Tier Location Distribution Processing Unit
811 Attribute-Derived Summary Calculation Processing Unit
812 Attribute-Difference-Derived Summary Calculation Processing Unit
814 Folder Content Data
815 Extension-Type Defining Data
816 Document Hit Data

The invention claimed is:

1. A file management system for managing files that are stored in a tiered folder, comprising:
a folder content data storage unit adapted to have stored therein content data of each folder in the tiered folder;
a folder summary calculation processing unit configured to reference the folder content data storage unit and automatically generate a character string indicating a summary of a plurality of files included in each parent folder selected by a user and each of plural subfolders immediately under said parent folder;
a display processing unit configured to display the generated character string on a display device,
wherein the generated character string indicating a summary of a plurality of files includes a total number of files of each type and other file attributes in said parent folder and said plural subfolders, and
wherein the folder summary calculation processing unit, when a plurality of subfolders in the selected folder includes similar files, generates a summary character string indicating the presence of a plurality of subfolders that includes similar files while also describing the names of the subfolders in the summary.

2. A file management system for managing files that are stored in a tiered folder, comprising:
a folder content data storage unit adapted to have stored therein content data of each folder in the tiered folder;
a folder summary calculation processing unit configured to reference the folder content data storage unit and automatically generate a character string indicating a summary of a plurality of files included in each parent folder selected by a user and each of plural subfolders immediately under said parent folder;
a display processing unit configured to display the generated character string on a display device,
wherein the generated character string indicating a summary of a plurality of files includes a total number of files of each type and other file attributes in said parent folder and said plural subfolders, and
wherein the folder summary calculation processing unit, when the selected folder does not contain any subfolders that include similar files and when there is a concentration of files in a subfolder, generates a summary character string indicating the presence of a subfolder with a concentration of files and the name of the subfolder with the concentration of the files.

3. A file management system for managing files that are stored in a tiered folder, comprising:
a file storage unit adapted to have stored therein a plurality of files;
a search index storage unit adapted to have stored therein a search index;
a query search processing unit configured to execute a query search with reference to the search index stored in the search index storage unit, and obtain search results;
a location distribution processing unit configured to acquire, for each parent folder and each plural subfolder immediately under said parent folder, information about the number of files that match the search results; and
a display processing unit configured to display on a display device the total number of files contained in each parent folder and each plural subfolder the number of the matching files for each folder and subfolder,
wherein the display processing unit omits display of folders that include no files that match the search results, and
wherein the display includes a total number of files of each type and other file attributes in said parent folder and said plural subfolders.

4. A file management system according to claim 3, wherein the display processing unit displays the number of the matching files in text.

5. A file management system according to claim 3, wherein the location distribution processing unit creates a histogram on the basis of the information about the number of the files that match the search results, and
the display processing unit displays the histogram for each folder.

6. A document file management system for managing files that are stored in a tiered folder, comprising:
a file storage unit adapted to have stored therein a plurality of files;
a search index storage unit adapted to have stored therein a search index;
a folder content data storage unit adapted to have stored therein content data of each folder in the tiered folder;
a folder summary calculation processing unit configured to, when a summary display is specified as a display mode, reference the folder content data storage unit, and automatically generate a character string indicating a summary of a plurality of files included in each parent folder selected by a user and each of plural subfolders immediately under said parent folder;
a query search processing unit configured to, when a location distribution display of query search results is specified as a display mode, execute a query search with reference to the search index stored in the search index storage unit, and obtain search results;
a location distribution processing unit configured to acquire, for each parent folder and each plural subfolder immediately under said parent folder, information about the number of files that match the search results; and
a display processing unit configured to display, in response to the specified display mode, the generated character string on a display device or display the total number of files contained in each parent folder and each plural subfolder the number of matching files on the display device, and
wherein the generated character string indicating a summary of a plurality of files includes a total number of files of each type and other file attributes in said parent folder and said plural subfolders.

* * * * *

UNITED STATES PATENT AND TRADEMARK OFFICE
CERTIFICATE OF CORRECTION

PATENT NO. : 8,661,064 B2  Page 1 of 1
APPLICATION NO. : 13/000393
DATED : February 25, 2014
INVENTOR(S) : Matsumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 51 days.

Signed and Sealed this
Twenty-ninth Day of September, 2015

Michelle K. Lee
*Director of the United States Patent and Trademark Office*